United States Patent
Earl et al.

(10) Patent No.: US 9,491,135 B1
(45) Date of Patent: Nov. 8, 2016

(54) SUB CLASS C REVERSE DOMAIN NAME SYSTEM ZONE COMPILATION

(71) Applicant: Sprint Communications Company L.P., Overland Park, KS (US)

(72) Inventors: Bryson Earl, Altamonte Springs, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 469 days.

(21) Appl. No.: 14/168,009

(22) Filed: Jan. 30, 2014

(51) Int. Cl.
  *G06F 15/16* (2006.01)
  *H04L 29/12* (2006.01)

(52) U.S. Cl.
  CPC .................................. *H04L 61/1511* (2013.01)

(58) Field of Classification Search
  CPC .................................................. H04L 61/1511
  See application file for complete search history.

(56) References Cited

U.S. PATENT DOCUMENTS

| | | | | |
|---|---|---|---|---|
| 7,280,519 B1* | 10/2007 | Shane | ................... | H04W 40/02 370/338 |
| 8,862,735 B1* | 10/2014 | Singh | ...................... | H04L 63/20 709/221 |
| 2014/0337530 A1* | 11/2014 | Amishav | ............. | H04L 41/5058 709/226 |

* cited by examiner

*Primary Examiner* — Kristie Shingles
*Assistant Examiner* — Mohammad Yousuf A Mian

(57) ABSTRACT

A subnetted class C internet protocol (IP) address domain name system (DNS) reverse zone file compiling server. The server comprises a memory, a processor, and an application stored in the memory that, when executed by the processor, generates a class C IP address DNS reverse zone file associated with the starting class C internet protocol address based on the parsing of the plurality of subnetted class C IP address DNS reverse zone files, wherein the class C IP address DNS reverse zone file comprises an entry for each of assigned internet protocol addresses, wherein each entry for each of the assigned internet protocol addresses directly maps a domain name to an internet protocol address and does not indicate a DNS canonical name type.

20 Claims, 3 Drawing Sheets

US 9,491,135 B1

SUB CLASS C REVERSE DOMAIN NAME SYSTEM ZONE COMPILATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The Internet is becoming increasingly prevalent in our daily lives with the rapid development and popularization of portable network capable devices. Additionally, more and more electronic devices that did not have network capabilities are becoming network capable. When a user inputs a name of a website or webpage to a network capable device, the name may be translated into a unique number, called an internet protocol address. A connection may then be established using the unique number and the user may be presented with the requested website or webpage. In some other cases, people want to look up a name of a computer based on a number, for example based on an internet protocol address. The number then may be translated into a corresponding name.

SUMMARY

In an embodiment, a subnetted class C internet protocol (IP) address domain name system (DNS) reverse zone file compiling server is disclosed. The server comprises a memory, a processor, and an application stored in the memory that, when executed by the processor, parses a plurality of subnetted class C IP address DNS reverse zone files, each subnetted class C IP address DNS reverse zone file defining a mapping from at least one DNS canonical name (CNAME) to a domain name of a subnetted class C internet protocol address zone. The application further generates a class C IP address DNS reverse zone file associated with the starting class C internet protocol address based on the parsing of the plurality of subnetted class C IP address DNS reverse zone files, wherein the class C IP address DNS reverse zone file comprises an entry for each of assigned internet protocol addresses, wherein each entry for each of the assigned internet protocol addresses directly maps a domain name to an internet protocol address and does not indicate a DNS canonical name type, and transmits the class C IP address DNS reverse zone file associated with the class C internet protocol address block to an authoritative DNS server, whereby reverse DNS look-up of domain names associated with subnetted class C internet protocol addresses using the DNS service is promoted.

In an embodiment, a subnetted class C internet protocol (IP) address domain name system (DNS) reverse zone file compiling server is disclosed. The server comprises a memory, a processor, and an application stored in the memory that, when executed by the processor, parses a plurality of subnetted class C IP address DNS reverse zone files, each subnetted class C IP address DNS reverse zone file defining a mapping from at least one DNS canonical name (CNAME) to a domain name of a subnetted class C internet protocol address zone. The application further generates a class B internet protocol address DNS reverse zone file associated with the starting class B internet protocol address based on the parsing of the plurality of subnetted class C IP address DNS reverse zone files, wherein the class B internet protocol address DNS reverse zone file comprises an entry for each of assigned internet protocol addresses, wherein each entry for each of the assigned internet protocol addresses directly maps a domain name to an internet protocol address and does not indicate a DNS canonical name type, and transmits the class B internet protocol address DNS reverse zone file associated with the class B internet protocol address to an authoritative DNS server, whereby reverse DNS look-up of domain names associated with subnetted class C internet protocol addresses using the DNS service is promoted.

In an embodiment, a method of compiling subnetted class C internet protocol (IP) address domain name system (DNS) reverse zone files is disclosed. The method comprises parsing an initial class C IP address DNS reverse zone file defining a mapping from at least one assigned internet protocol address to a DNS canonical name (CNAME) of a subnetted class C internet protocol address zone, and parsing a plurality of subnetted class C IP address DNS reverse zone files, each subnetted class C IP address DNS reverse zone file defining a mapping from at least one DNS canonical name to a domain name of a subnetted class C internet protocol address zone. The method further comprises generating a class C IP address DNS reverse zone file associated with the starting class C internet protocol address based on the parsing of the plurality of subnetted class C IP address DNS reverse zone files, wherein the class C IP address DNS reverse zone file comprises an entry for each of assigned internet protocol addresses, wherein each entry for each of the assigned internet protocol addresses directly maps a domain name to an internet protocol address and does not indicate a DNS canonical name type, and transmitting the class C IP address DNS reverse zone file associated with the class C internet protocol address to an authoritative DNS server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
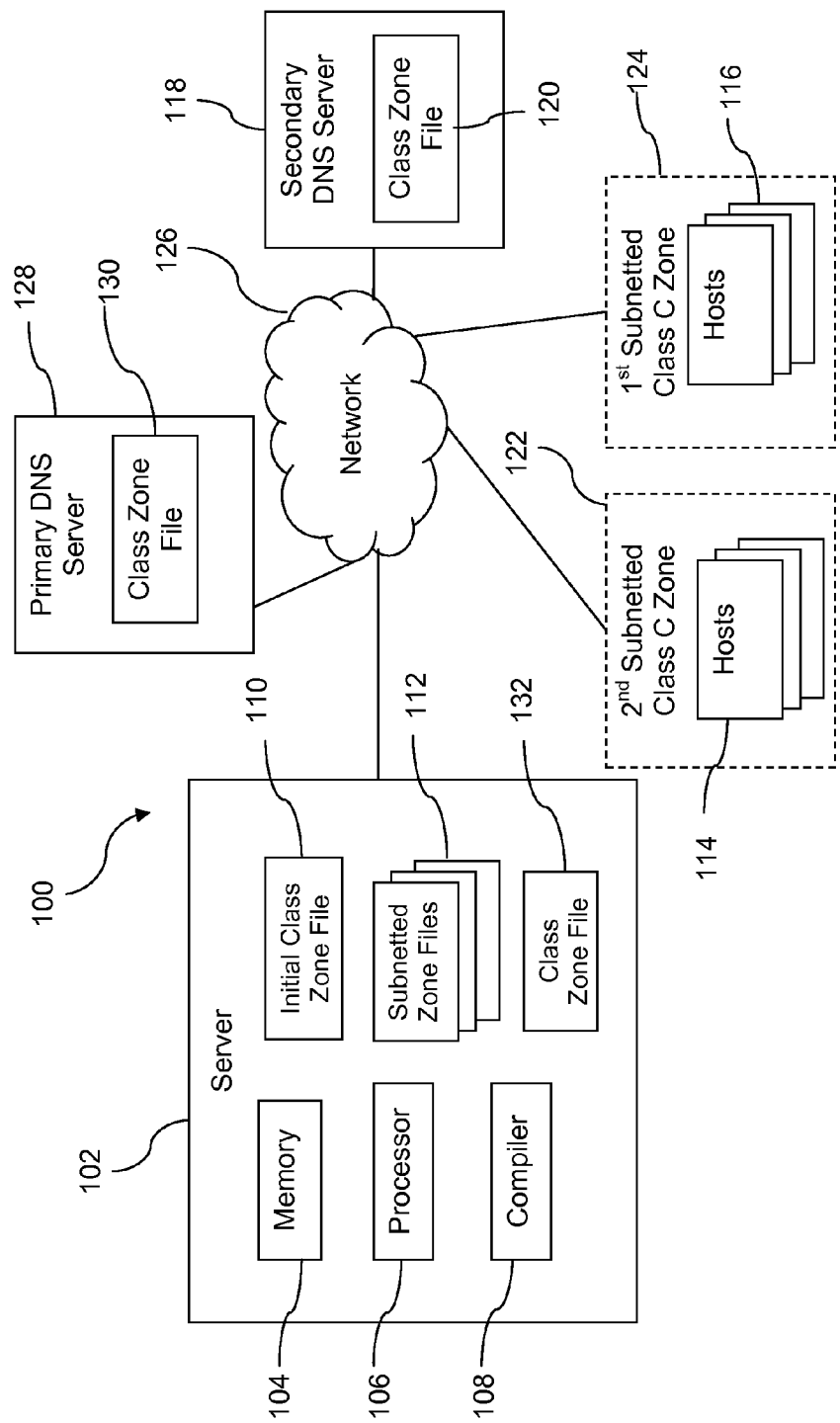
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A reverse domain name system (DNS) lookup is done by translating an internet protocol (IP) address to an associated domain name or an associated host name, for example from 192.0.65.0 into www.thisisanexample.com. A typical DNS zone boundary falls on a dot in an internet protocol address, and this means the smallest DNS zone would have at least 256 internet protocol addresses, which is the number of internet protocol addresses in one class C internet protocol address block. When a reverse DNS lookup involves a range of internet protocol addresses smaller than 256 that is assigned to a customer, it is called subnetted class C internet protocol address DNS reverse lookup.

Existing mechanisms that deal with subnetted class C internet protocol address DNS reverse lookup may involve and/or introduce a lot of zone files and zone file transfers between primary and secondary DNS servers, and may thus cause lots of overhead on the DNS servers. The reason is that with the existing mechanisms, each subnetted class C internet protocol address zone is assigned with a subnetted class C IP (internet protocol) address DNS reverse zone file. The subnetted class C IP address DNS reverse zone files may be transferred from a primary DNS server to a secondary DNS server when a subnetted class C IP address DNS reverse zone file is updated.

A typical subnetted class C internet protocol address DNS reverse lookup query is currently solved in two steps where two queries are involved. A first query is the subnetted class C internet protocol address DNS reverse lookup query itself, with an internet protocol address, and may be answered by an authoritative DNS name server from a network service provider or DNS hosting service provider. The authoritative DNS name server may refer to a class C IP address DNS reverse zone file, and reply with a first reply/response comprising a DNS canonical name. A second query may then be sent with the DNS canonical name to look up a domain name or host name that is associated with the internet protocol address. The authoritative DNS name server may hold a subnetted class C IP address DNS reverse zone file associated with a subnetted class C internet protocol address zone comprising the requested internet protocol address. The second query may be answered with a second reply/response comprising the requested domain name or the requested host name.

Also, when a customer sees the first reply with the DNS canonical name, the customer may think an error occurred and may contact a network service provider or a DNS hosting service provider. A representative from the network service provider or the DNS hosting service provider may spend time, for example up to about an hour in some cases, explaining the situation. This time may be saved by introducing a method without generating a reply with a DNS canonical name in a subnetted class C internet protocol address DNS reverse lookup.

When a change is made to a subnetted class C internet protocol address DNS reverse zone, a customer may make the change to the class C IP address DNS reverse zone file on a server from a network service provider or DNS hosting service provider, for example a provisioning server. Any error made to the class C IP address DNS reverse zone file by the customer may affect the entire class C IP address DNS reverse zone file, and other customers associated with this class C IP address DNS reverse zone file may also be affected. The present disclosure teaches a system and method for managing subnetted class C internet protocol address DNS reverse lookup by compiling separate subnetted class C IP address DNS reverse zone files into only one zone file and transmitting the one zone file to an authoritative DNS server.

For example, a compiler application on a server of a network service provider or a DNS hosting service provider may compile separate subnetted class C IP address DNS reverse zone files for subnetted class C internet protocol address zones into one zone file for the whole class C internet protocol address block or class B internet protocol address block based on canonical names (CNAMEs). Additionally, only one zone with all the assigned internet protocol addresses within the same class C/B internet protocol address block may be generated. The compiled class C/B internet protocol address DNS reverse zone file may then be transmitted to an authoritative DNS name server. When a subnetted class C internet protocol address DNS reverse lookup query is sent by a DNS resolver application, the authoritative DNS name server may reply/respond with a requested domain/host name after referencing the stored class C/B internet protocol address DNS reverse zone file. Thus, the subnetted class C internet protocol address DNS reverse lookup may be solved in one step with one reply/response. Compared to the current two-step method, this one-step method may reduce query time per lookup, amount of queries per lookup, and/or respond time per lookup. Also, no DNS canonical name record may be generated as an intermediary result for the subnetted class C internet protocol address DNS reverse lookup, and so no confusion may be caused to a customer.

When a change is made to any of the subnetted class C internet protocol address zones, the corresponding subnetted class C IP address DNS reverse zone file on the server of the network service provider may be updated based on the change. The change to the subnetted class C internet protocol address zone may be made by the network service provider or by a customer through a web interface built for customers to make changes to assigned internet protocol address ranges. Since the change is made to the relevant subnetted class C IP address DNS reverse zone file, other customers with other subnetted class C internet protocol address zones may not be affected. An updated class C/B internet protocol address DNS reverse zone file may be generated to replace the existing class C/B internet protocol address DNS reverse zone file, and a copy of the updated class C/B internet protocol address DNS reverse zone file may be transmitted to the authoritative DNS name server.

Turning now to FIG. 1, a communication system 100 is described. In an embodiment, the communication system 100 comprises a server 102, a primary DNS server 128, a secondary DNS server 118, and a plurality of subnetted class C internet protocol address zones 122-124. The server 102 may comprise a memory 104, a processor 106, a compiler application 108, an initial class zone file 110, a class zone file 132, and subnetted zone files 112. The primary DNS server 128 and the secondary DNS server 118 may each comprise a class zone file 130 and 120 respectively. A first subnetted class C internet protocol address DNS zone 122 may be assigned to a first customer and may comprise a first plurality of hosts 114. A second subnetted class C internet protocol address DNS zone 124 may be assigned to a second customer and may comprise a second plurality of hosts 116. The server 102 is coupled to a network 126, for example a server 102 operated by a network service provider. The primary DNS server 128, the secondary DNS server 118, and the hosts 114-116 may also have access to the network 126. The network 126 may comprise any combination of private and public networks.

It is understood that the system 100 may comprise any number of hosts 114-116 and any number of secondary DNS servers 118. The host 114/116, the server 102, the primary DNS server 128, and the secondary DNS server 118 may be any of a desktop computer, a server computer, or another network capable device. The hosts 114-116, the server 102, the primary DNS server 128, and the secondary DNS server 118 may access the network 126 through wired or wireless access network. The wired access network may be abstracted in different ways and may comprise cable modems and Ethernet routers, switches, or hubs. The wireless access network may also be abstracted in different ways and may comprise wireless access points, cable modems, Ethernet or wireless routers, switches, or hubs, servers and data storages such as home location registers (HLRs) or servers that implement the functionality of home location registers, visitor location registers (VLRs) or servers that implement the functionality of visitor location registers, base transceiver stations, base station controllers (BSCs), mobile switching centers (MSCs), and other network nodes that are specifically associated with providing wireless access and connectivity to the hosts and servers.

The primary DNS server 128 and the secondary DNS server 118 may be authoritative DNS servers. An authoritative DNS server of a domain may be a DNS name server that has a complete copy of the domain's information, either entered by an administrator or transferred from a primary DNS server. The secondary DNS server 118 may check periodically on the primary DNS server 128 for any change in the class C/B internet protocol address DNS reverse zone file 130. Class C internet protocol addresses are internet protocol addresses whose leftmost three bits are fixed as $110_2$ in binary format and bits 4 to 24 are network identification numbers. The remaining 8 bits of the internet protocol address is a host identification number and thus up to about 256 internet protocol addresses may exist in a class C internet protocol address block. Class B internet protocol addresses are internet protocol addresses whose leftmost two bits are fixed as $10_2$ in binary format and bits 3 to 16 are network identification numbers. The remaining 16 bits of the internet protocol address is a host identification number and thus up to about 65,536 internet protocol addresses may exist in a class B internet protocol address block.

A refresh interval may be defined for a class C/B internet protocol address zone, and the secondary DNS server 118 may check periodically, once every refresh interval, on the primary DNS server 128 for any change in the class C/B internet protocol address DNS reverse zone file 130. Alternatively, the primary DNS server 128 may send a notice to the secondary DNS server 118 when a change is made to the class C/B internet protocol address DNS reverse zone file 130. The secondary DNS server 118 may then request for the updated class C/B internet protocol address DNS reverse zone file 130 on the primary DNS server 128. Then the updated class C/B internet protocol address DNS reverse zone file 130 may be transferred from the primary DNS server 128 to the secondary DNS name server 118. When a subnetted class C internet protocol address DNS reverse lookup request is received at the primary DNS server 128 or the secondary DNS server 118, only one response may be sent to the requester by the primary DNS server 128 or the secondary DNS server 118 after referencing to the class B/C internet protocol address DNS reverse zone file 130 or 120. The one response may comprise the associated host name/domain name corresponding to a requested internet protocol address.

The subnetted class C IP address DNS reverse zone file 112 may be a zone file for a subnetted class C internet protocol address zone 122/124. The total number of subnetted class C IP address DNS reverse zone files 112 may match the total number of subnetted class C internet protocol address zones 122-124 within a class C internet protocol address block, or in other words, with a same starting class C internet protocol address. A subnetted class C internet protocol DNS reverse zone file 112 may comprise DNS data of a subnetted class C internet protocol address zone, for example canonical names, a domain name, and at least one host name. A domain name may be the name of a network associated with an organization, for example a name for a network associated with a subnetted class C internet protocol address zone 122/124, for example thisisanexample.com. A host name may be a name to specify a computer within an associated organization, for example www.thisisanexample.com or webmail.thisisanexample.com. A DNS canonical name record may be a type of resource record in the domain name system that specifies that a host name/domain name is an alias of another, DNS canonical name. DNS canonical names may typically be used to create subdomains. In a subnetted class C internet protocol address DNS reverse lookup, a DNS canonical name may be an intermediary result. With the DNS canonical name, a final domain name or host name may be found and given as the result of the subnetted class C internet protocol address DNS reverse lookup.

For example, each line of the subnetted class C IP address DNS reverse zone file 112 may comprise a DNS canonical name and a corresponding domain name/host name. In an embodiment, all the subnetted class C IP address DNS reverse zone files 112 corresponding to assigned internet protocol addresses within the same class C/B internet protocol address block may be used to compile a class C/B internet protocol address DNS reverse zone file 132. For example, the DNS canonical name record may be used to match the internet protocol address from an initial class C IP address DNS reverse zone file 110 with the corresponding domain name/host name from a subnetted class C IP address DNS reverse zone file 112 to compile a class C/B internet protocol address DNS reverse zone file 132.

When a customer wants to make a change to a subnetted class C internet protocol address zone 122/124, the customer may contact the network service provider or make the change on a web interface provided by the network service provider. When a change is made to any of the subnetted class C internet protocol address zone 122/124, a corresponding subnetted class C IP address DNS reverse zone file 112 is updated accordingly. For example, an enterprise may have been assigned with a subnetted class C internet address zone with 8 internet protocol addresses initially. Later on with the development of the enterprise, more internet protocol addresses may be desired by the enterprise. For example, the enterprise may request for another 16 internet protocol addresses to be included to the assigned subnetted class C internet address zone. A corresponding subnetted class C IP address DNS reverse zone file may be updated with the newly added 16 internet protocol addresses when the requested 16 internet protocol addresses are added to the subnetted class C internet protocol address zone.

When any of the subnetted class C IP address DNS reverse zone files 112 is updated, the network service provider may take further action. For example, a notice may be configured to be sent to the compiler application 108 about the update on the updated subnetted class C IP address DNS reverse zone file 112. The compiler application 108 may then compile a new class C/B internet protocol address DNS reverse zone file 132 based on the initial class C IP address DNS reverse zone file 110 and all the most recent associated subnetted class C IP address DNS reverse zone files 112.

The initial class internet protocol address DNS reverse zone file 110 may be a zone file for a whole class of internet protocol address block, for example Class C. The initial class C IP address DNS reverse zone file 110 may comprise DNS data for the whole class C internet protocol address block. For example, the initial class C IP address DNS reverse zone file 110 may comprise internet protocol addresses of the whole class C internet protocol address block and an associated DNS canonical name for each of the internet protocol addresses. For example, when the internet protocol address and corresponding domain are maintained by the network service provider, a line of the initial class internet protocol address DNS reverse zone file 110 may comprise an internet protocol address within the class C internet protocol address block and a corresponding DNS canonical name. Alternatively, when the internet protocol address and corresponding domain are delegated to and maintained by a customer, a line of the initial class internet protocol address DNS reverse zone file 110 may comprise an internet protocol address within the class C internet protocol address block and a corresponding name server record (NS record). In this case, the initial class internet protocol address DNS reverse zone file 110 may reference to a DNS server of the customer with a subnetted class C internet protocol DNS reverse lookup query. Please note that in a preferred embodiment, the internet protocol addresses and corresponding domains are maintained by the network service provider.

The initial class C IP address DNS reverse zone file 110 may be used by the compiler 108 with the associated subnetted class C IP address DNS reverse zone files 112 to compile class internet protocol address DNS reverse zone files 132. The compiler 108 may parse the DNS canonical name records in the subnetted class C IP address DNS reverse zone files 112 and the DNS canonical name records in the initial class C IP address DNS reverse zone file 110. With the same DNS canonical name, an associated internet protocol address from the initial class C IP address DNS reverse zone file 110 may be matched with an associated host name/domain name from one of the subnetted class C IP address DNS reverse zone files 112. A final DNS entry may be generated with the internet protocol address and the corresponding host name/domain name. A new class internet protocol address DNS reverse zone file 132 may be generated with the final DNS entries, and an existing class internet protocol address DNS reverse zone file 132 may be replaced by the newly generated class internet protocol address DNS reverse zone file 132. The newly generated class internet protocol address DNS reverse zone file 132 may be transmitted to the primary DNS server 128 to replace an existing class internet protocol address DNS reverse zone file 130.

When a change is made to any of the subnetted class C IP address DNS reverse zone files 112, the compiler 108 may generate a new class internet protocol address DNS reverse zone file 132 based on the initial class internet protocol address DNS reverse zone file 110 and based on the most current subnetted class C IP address DNS reverse zone files 112. The new class internet protocol address DNS reverse zone file 132 may be transmitted to the primary DNS server 128 to replace an older version of the class internet protocol address DNS reverse zone file 130.

The compiler application 108 may be stored in the memory 104 of the server 102. When executed by the processor 106, the compiler 108 may compile class internet protocol address DNS reverse zone files 132 under predefined circumstances. For example, the compiler 108 may gather related DNS data and compile a class internet protocol address DNS reverse zone file 132. For example, the compiler 108 may gather related DNS data and compile a class internet protocol address DNS reverse zone file 132 when a server 102 is powered on for the first time. The compiler 108 may gather related DNS data and compile a class internet protocol address DNS reverse zone file 132 when a change is made to any of the subnetted class C IP address DNS reverse zone files 112. For example, when a notice is received at the compiler 108 about a change in any of the subnetted class C IP address DNS reverse zone files 112, the compiler 108 may compile a new class internet protocol address DNS reverse zone files 132. Additionally, the compiler 108 may periodically gather related DNS data and compile a class internet protocol address DNS reverse zone file 132, for example every two hours, every four hours, every eight hours, or at some other periodic interval. When a new internet protocol address DNS reverse zone file 132 is generated, the newly generated class internet protocol address DNS reverse zone file 132 may be transmitted to the primary DNS server 128.

The compiler 108 may generate only one zone from all the assigned internet protocol addresses in a class C internet protocol address block or a class B internet protocol address block. For example, a single zone comprising all the assigned internet protocol address within a class C internet protocol address block may be generated. As another example, a single zone comprising all the assigned internet protocol address within a class B internet protocol address block may be generated. A single class C internet protocol address zone may comprise up to 256 internet protocol addresses, and a single class B internet protocol address zone may comprise up to 65,536 internet protocol addresses.

Figure 2:
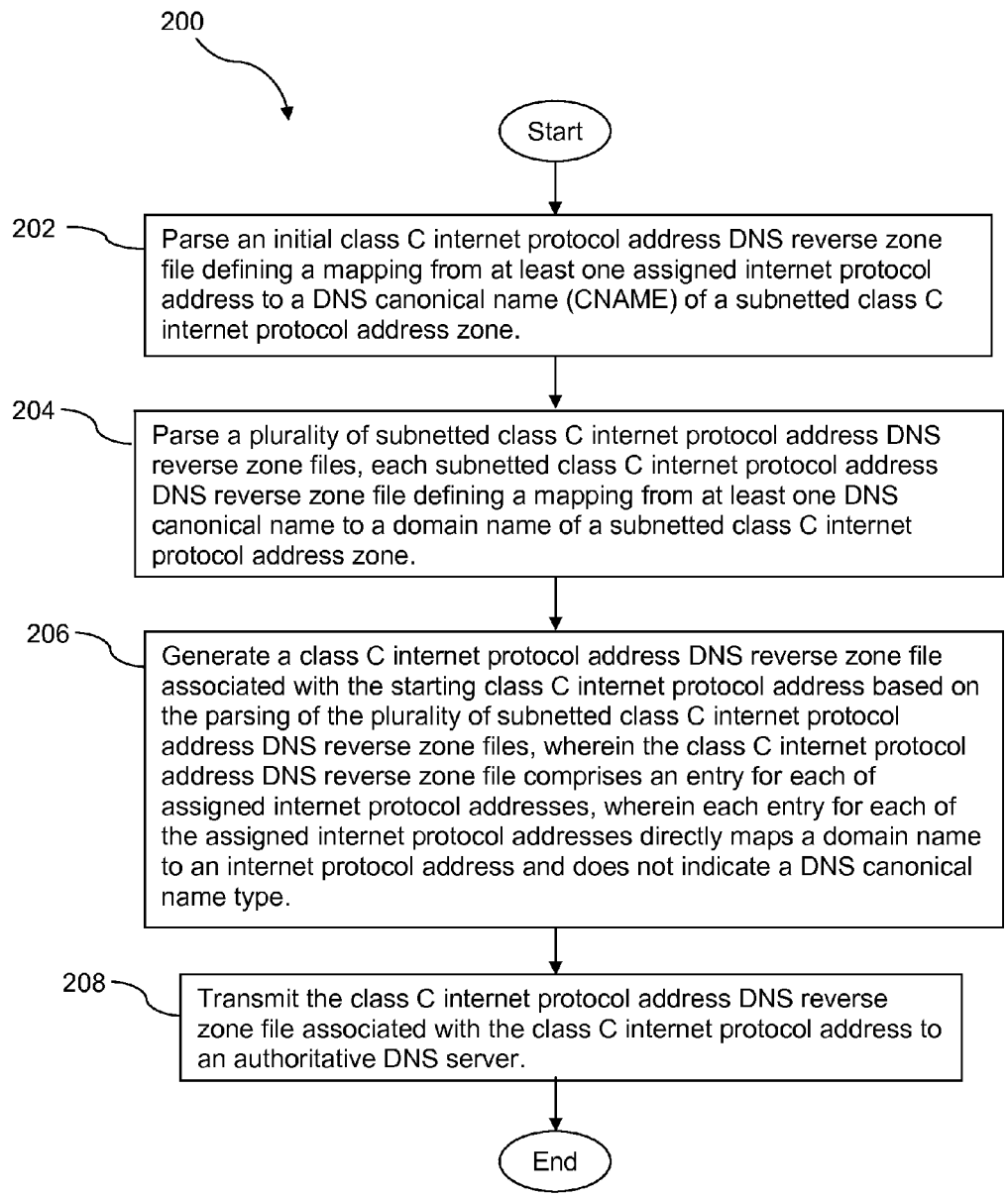
FIG. 2 is a flow chart illustrating a method according to an embodiment of the disclosure.

Turning now to FIG. 2, a method 200 is described. At block 202, an initial class C IP address DNS reverse zone file is parsed defining a mapping from at least one assigned internet protocol address to a DNS canonical name (CNAME) of a subnetted class C internet protocol address zone. For example, the initial class C IP address DNS reverse zone file 110 may define at least one assigned internet protocol address to a DNS canonical name of a subnetted class C internet protocol address zone 122/124. An assigned internet protocol address is an internet protocol address that has been assigned to a customer. The initial class C IP address DNS reverse zone file 110 may be parsed by the compiler application 108.

At block 204, a plurality of subnetted class C IP address DNS reverse zone files, each subnetted class C IP address DNS reverse zone file defining a mapping from at least one DNS canonical name to a domain name of a subnetted class C internet protocol address zone, are parsed. For example, each of the subnetted class C IP address DNS reverse zone files 112 may define a mapping from at least one DNS canonical name to a domain name of a subnetted class C internet protocol address zone 122/124. Each line of the subnetted class C IP address DNS reverse zone file 112 may comprise a DNS canonical name to a domain name of a subnetted class C internet protocol address zone 122/124 or a host name within the subnetted class C internet protocol address zone 122/124. The subnetted class C IP address DNS reverse zone files 112 are parsed by the compiler 108.

At block 206, a class C IP address DNS reverse zone file associated with the starting class C internet protocol address based on the parsing of the plurality of subnetted class C IP address DNS reverse zone files is generated, wherein the class C IP address DNS reverse zone file comprises an entry for each of assigned internet protocol addresses, wherein each entry for each of the assigned internet protocol addresses directly maps a domain name to an internet protocol address and does not indicate a DNS canonical name type. For example, the compiler 108 may generate a final DNS entry with an assigned internet protocol address from the initial class C IP address DNS reverse zone file 110 and an associated domain name/host name from a subnetted class C IP address DNS reverse zone files 112. The final DNS entry may not indicate a DNS canonical name type. The assigned internet protocol address and the associated domain name/host name are matched using a same DNS canonical name based on parsing all the subnetted class C IP address DNS reverse zone files 112 with the assigned subnetted class C internet protocol addresses associated with the same starting class C internet protocol address. In other words, the subnetted class C IP address DNS reverse zone files 112 parsed to generate the class C IP address DNS reverse zone file 132 are associated with the assigned subnetted class C internet protocol addresses within a same class C internet protocol address block.

At block 208, the class C IP address DNS reverse zone file associated with the class C internet protocol address is transmitted to an authoritative DNS server. For example, when the class C IP address DNS reverse zone file 132 associated with the starting class C internet protocol address is generated, the newly generated class C IP address DNS reverse zone file 132 may be transmitted to the authoritative primary DNS server 128. The primary DNS server 128 may copy the updated class C IP address DNS reverse zone file 130 to the secondary DNS server 118.

Figure 3:
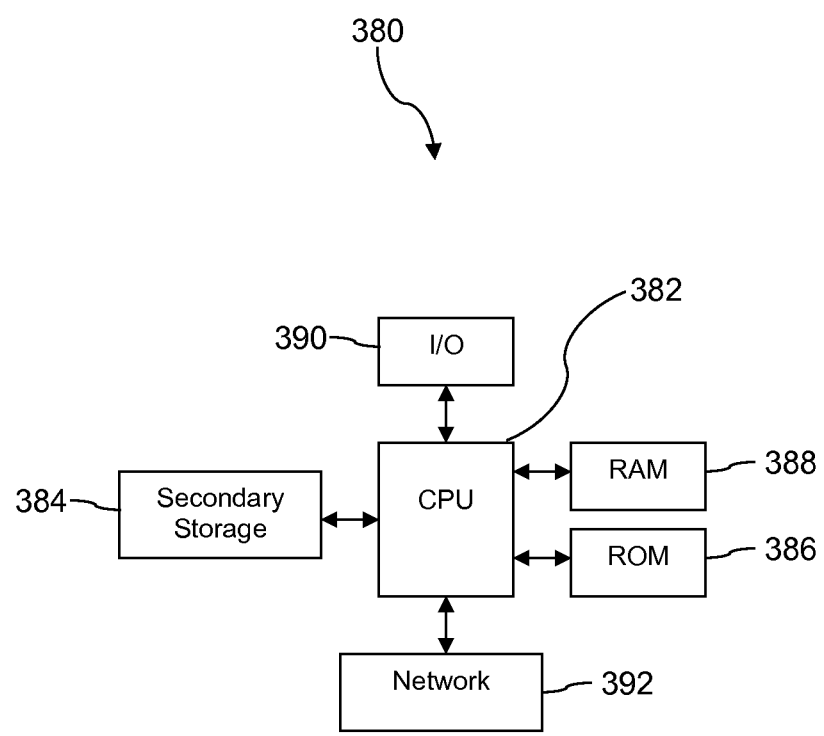
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A subnetted class C internet protocol (IP) address domain name system (DNS) reverse zone file compiling server, comprising:
    a memory;
    a processor; and
    an application stored in the memory that, when executed by the processor
        parses a plurality of subnetted class C IP address DNS reverse zone files, each subnetted class C IP address DNS reverse zone file defining a mapping from at least one DNS canonical name (CNAME) to a domain name of a subnetted class C internet protocol address zone,
        generates a class C IP address DNS reverse zone file associated with a starting class C internet protocol address based on the parsing of the plurality of subnetted class C IP address DNS reverse zone files, wherein the class C IP address DNS reverse zone file comprises an entry for each of assigned internet protocol addresses, wherein each entry for each of the assigned internet protocol addresses directly maps a domain name to an internet protocol address and does not indicate a DNS canonical name type, and transmits the class C IP address DNS reverse zone file associated with a class C internet protocol address block to an authoritative DNS server, whereby reverse DNS look-up of domain names associated with subnetted class C internet protocol addresses using the DNS service is promoted.

2. The server of claim 1, wherein the authoritative DNS server is a primary DNS server, and the class C IP address DNS reverse zone file is copied from the primary DNS server to a secondary DNS server when the primary DNS server receives a new or updated class C IP address DNS reverse zone file.

3. The server of claim 1, wherein the authoritative DNS server is a DNS name server that replies to DNS queries with answers that have been configured by an original source.

4. The server of claim 1, wherein the class C IP address DNS reverse zone file is compiled based on all the subnetted class C IP address DNS reverse zone files within the same class C internet protocol address block.

5. The server of claim 1, wherein only one zone is generated by combining all subnetted class C internet protocol address zones of the subnetted class C IP address DNS reverse zone files within the same class C internet protocol address block, and the one zone is configured in the settings of the compiling server.

6. The server of claim 1, wherein a subnetted class C IP address DNS reverse zone file is updated when a subnetted class C internet protocol address zone is updated, and wherein a new class C IP address DNS reverse zone file is compiled when a subnetted class C IP address DNS reverse zone file is updated.

7. The server of claim 6, wherein the previous class C IP address DNS reverse zone file is replaced by the newly generated class C IP address DNS reverse zone file.

8. The server of claim 1, wherein the class C IP address DNS reverse zone file is compiled at a predefined time interval.

9. A subnetted class C internet protocol (IP) address domain name system (DNS) reverse zone file compiling server, comprising:
   a memory;
   a processor; and
   an application stored in the memory that, when executed by the processor
      parses a plurality of subnetted class C IP address DNS reverse zone files, each subnetted class C IP address DNS reverse zone file defining a mapping from at least one DNS canonical name (CNAME) to a domain name of a subnetted class C internet protocol address zone,
      generates a class B internet protocol address DNS reverse zone file associated with a starting class B internet protocol address based on the parsing of the plurality of subnetted class C IP address DNS reverse zone files, wherein the class B internet protocol address DNS reverse zone file comprises an entry for each of assigned internet protocol addresses, wherein each entry for each of the assigned internet protocol addresses directly maps a domain name to an internet protocol address and does not indicate a DNS canonical name type, and
      transmits the class B internet protocol address DNS reverse zone file associated with a class B internet protocol address block to an authoritative DNS server,
      whereby reverse DNS look-up of domain names associated with subnetted class C internet protocol addresses using the DNS service is promoted.

10. The server of claim 9, wherein a subnetted class C internet protocol address domain name system reverse lookup query is answered with only one response by the authoritative DNS server referencing to the compiled class B internet protocol address DNS reverse zone file.

11. The server of claim 9, wherein only one zone of the class B internet protocol address block is created from combining all the subnetted class C internet protocol address zones within the same class B internet protocol address block defined in the subnetted class C IP address DNS reverse zone files.

12. The server of claim 9, wherein when a change is made to a subnetted class C IP address DNS reverse zone file, the application compiles the class B internet protocol address DNS reverse zone file based on the most current subnetted class C IP address DNS reverse zone files, and transmits the newly compiled class B internet protocol address DNS reverse zone file to the authoritative DNS name server to replace the existing class B internet protocol address DNS reverse zone file.

13. The server of claim 9, wherein an initial class C IP address DNS reverse zone file is used with the subnetted class C IP address DNS reverse zone files to compile the class B internet protocol address DNS reverse zone file.

14. The server of claim 9, wherein the authoritative DNS server is a primary DNS server, and the class B internet protocol address DNS reverse zone file is copied from the primary DNS server to a secondary DNS server when the primary DNS server receives a new or updated class B internet protocol address DNS reverse zone file.

15. The server of claim 14, wherein the secondary DNS server checks periodically on the primary DNS server for any change in the class B internet protocol address DNS reverse zone file.

16. The server of claim 14, wherein the primary DNS server sends a notice to the secondary DNS server when a change is made to the class B internet protocol address DNS reverse zone file.

17. A method of compiling subnetted class C internet protocol (IP) address domain name system (DNS) reverse zone files, comprising:
   parsing an initial class C IP address DNS reverse zone file defining a mapping from at least one assigned internet protocol address to a DNS canonical name (CNAME) of a subnetted class C internet protocol address zone;
   parsing a plurality of subnetted class C IP address DNS reverse zone files, each subnetted class C IP address DNS reverse zone file defining a mapping from at least one DNS canonical name to a domain name of a subnetted class C internet protocol address zone;
   generating a class C IP address DNS reverse zone file associated with the starting class C internet protocol address based on the parsing of the plurality of subnetted class C IP address DNS reverse zone files, wherein the class C IP address DNS reverse zone file comprises an entry for each of assigned internet protocol addresses, wherein each entry for each of the assigned internet protocol addresses directly maps a domain name to an internet protocol address and does not indicate a DNS canonical name type; and transmitting the class C IP address DNS reverse zone file associated with the class C internet protocol address to an authoritative DNS server.

18. The method of claim 17, wherein the authoritative DNS server handles subnetted class C internet protocol (IP) address domain name system (DNS) reverse lookup queries.

19. The method of claim 17, wherein the class C IP address DNS reverse zone file is maintained by a compiling server of a network service provider.

20. The method of claim 17, wherein Class C internet protocol addresses are internet protocol addresses whose leftmost three bits are fixed as 110 in the binary form.

* * * * *